April 3, 1956  J. R. BAYSTON  2,740,265
MACHINE FOR MANUFACTURING ICE CUBES
Filed May 3, 1954  2 Sheets-Sheet 1
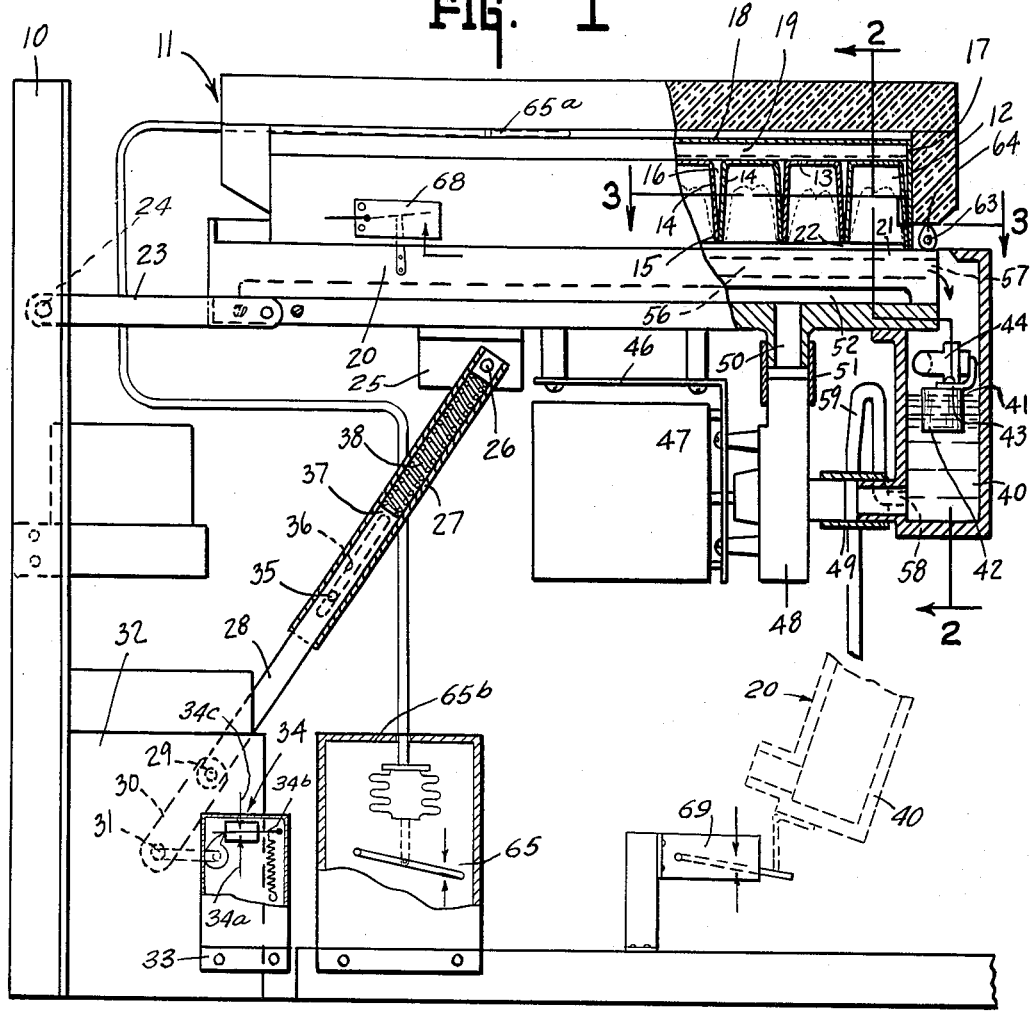
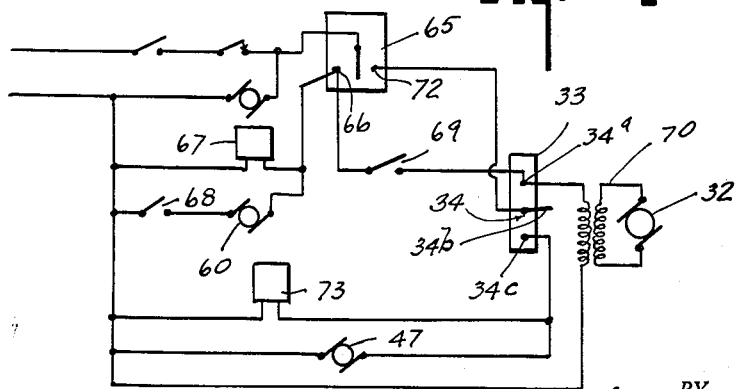
INVENTOR.
JOHN R. BAYSTON.
BY
Lockwood, Galt, Woodard & Smith,
ATTORNEYS.

April 3, 1956  J. R. BAYSTON  2,740,265
MACHINE FOR MANUFACTURING ICE CUBES
Filed May 3, 1954  2 Sheets-Sheet 2

INVENTOR.
JOHN R. BAYSTON.
BY
Lockwood, Galt, Woodard & Smith
ATTORNEYS.

United States Patent Office 2,740,265
Patented Apr. 3, 1956

2,740,265

MACHINE FOR MANUFACTURING ICE CUBES

John R. Bayston, Van Nuys, Calif., assignor to John R. Bayston, trustee, Icecrafter (Liquidating) Trust, Van Nuys, Calif.

Application May 3, 1954, Serial No. 427,052

8 Claims. (Cl. 62—7)

This invention relates to a machine for manufacturing ice cubes automatically, wherein a number of individual ice cubes are simultaneously frozen and thereupon automatically released from the freezing cells for discharge, as generally disclosed in my Letters Patent No. 2,542,892, granted February 20, 1951, for "Machine for Manufacturing Ice," and my Letters Patent No. 2,563,093, granted August 7, 1951, for "Ice Making Machine."

It is the object of this invention to provide a structure and mechanism applicable to a machine of this general type wherein ice is caused to be formed in an evaporator comprising a group of open bottom cells, subjected to alternate freezing and defrosting cycles, through the discharge of a stream of liquid sprayed upwardly into the cells for building up and forming ice cubes therein while the unfrozen portion of the liquid freely flows therefrom.

One feature of the invention resides in a movable platen adapted to swing to and from said closing position for controlling the flow of liquid to and from the cells during the freezing cycle and permitting discharge of the frozen ice cubes from the cells during the defrosting cycle; wherein said platen is provided with a head having spray nozzles through which liquid is sprayed upwardly into and centrally of the cells in association with adjacent drainage passages for returning unfrozen liquid from the cells into the platen head during the freezing operation.

Another feature of the invention resides in a platen freeing device for causing the platen to be broken away and effect release thereof from the ice cubes formed in the cells to facilitate its movement to cube discharge position.

A further feature of the invention resides in the provision of a liquid reservoir and pumping system therefor carried directly by the platen and movable therewith for receiving and pumping liquid into the platen head and through the spray nozzles, and receiving the waste or excess liquid from the cells and platen head as ice is built up during the freezing cycle.

A further feature of the invention resides in the provision of a float control contained in said reservoir controlling the liquid level therein with respect to a liquid feed from a supply source; and in association with a syphon having its inlet adjacent the bottom of the reservoir for syphoning off waste liquid and impurities accumulating in the bottom of the reservoir following the freezing cycle.

The full nature of the invention will be understood from the accompanying drawings and the following description and claims:

Fig. 1 is a side elevation of the evaporator unit, including the freezing cells and platen with a portion thereof shown in section and positioned during the freezing cycle.

Fig. 4 is a layout of the electric control circuit.

Figure 2:
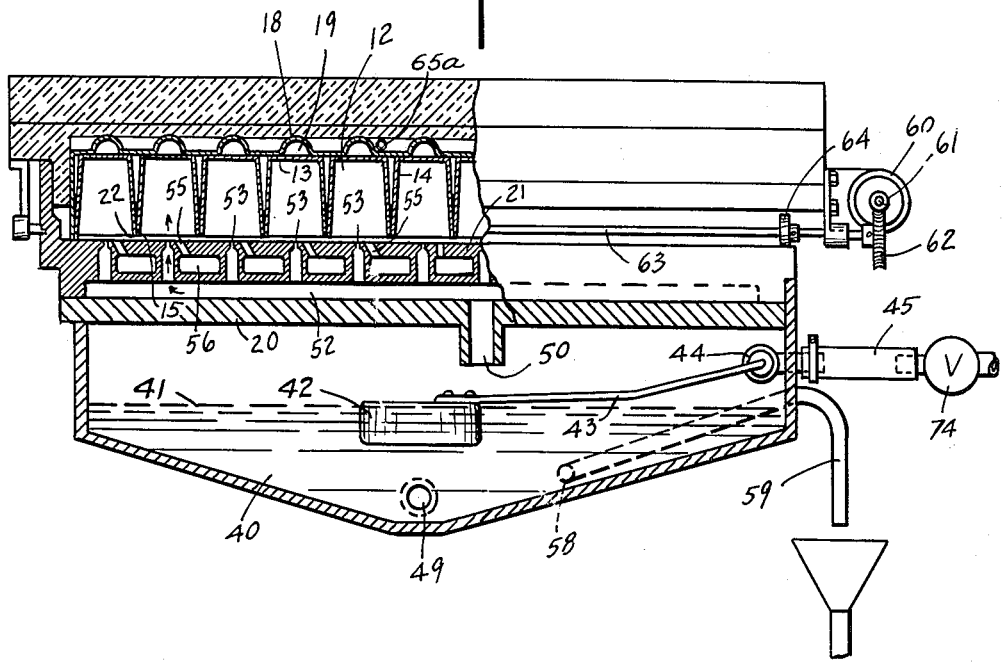
Fig. 2 is a section taken on the line 2—2 of Fig. 1.

In the drawings there is illustrated that portion of the ice making machine comprising the heat exchange unit or evaporator and the liquid control platen, reference being made to the above-mentioned Letters Patent in respect to a refrigerant system employed therewith. Said machine includes a supporting frame 10 carrying a heat exchange unit or evaporator generally indicated at 11. Said unit consists of a plurality of ice cube freezing and forming cells 12. Said cells are banked in the evaporator to lie adjacent and in contact with each other at their lower ends, there being shown herein one hundred twenty-one cells arranged in rows of eleven cells each. Each cell is separately formed with the group of cells being secured in their associated relation in the manner set forth in my copending application Serial No. 364,793, filed June 29, 1953, now Patent No. 2,726,516, for "Evaporator for Producing Ice Cubes and Method of Making Same."

Said cells are each open at the bottom and closed at the top, having a top closure 13 and four side walls 14. The side walls 14 of adjacent cells are joined and sealed at the bottom as indicated at 15, in any suitable manner such as set forth in the above-mentioned application. Said walls 14 extend upwardly and inwardly at an angle, so that the cells taper from their open bottom toward their closed top, leaving a refrigerant passage 16 therebetween, said passage surrounding all four sides of each cell. Said cells are grouped and embraced by an outer casing 17 having its top wall formed with a series of parallel corrugations 18 to provide refrigerant passages 19 lying immediately above and in contact with several top closures 13 of said cells. Said passages 19 extend across the several rows of cells in communication with those passages 16 lying transversely thereof, as shown in Fig. 1. Thus, the refrigerant circulating through the passages 19 will likewise enter and circulate about the side walls of the cells through their surrounding passages 16.

The casing 17 of the evaporator is closed and sealed at its lower end during the freezing cycle by the platen 20 having an upper liquid discharge head 21. However, the side walls 14 of the several cells terminate short of the head 21 to leave a small space therebetween, as indicated at 22. The spaced relation of the side walls 14, at 22, permits the liquid to be frozen with an ice fin joining all of the cubes frozen in said cells about their bottom edges to facilitate joint discharge of the cubes to be subsequently broken from each other. Said platen 20 has secured thereto on opposite sides, the pivot straps 23 which in turn are pivoted at 24 to the supporting frame 10. Said strips are arranged to permit the platen to be swung upwardly into sealing relation with the casing 17 during the freezing cycle to be swung downwardly therefrom for ice cube discharge during the defrosting cycle.

For swinging the platen to and from its closed position it is provided on the underside thereof toward the pivot straps with a pivot block 25 to which there is pivotally connected at 26 an actuating sleeve 27. Said sleeve telescopes at its lower end upon an actuating rod 28 having its free end pivoted at 29 to a crank arm 30 secured to a motor driven shaft 31 driven by the motor 32. Indicated at 33 there is a micro switch mounting bracket supporting a micro switch 34 in the motor control circuit. The actuating rod 28 telescopes in the actuating sleeve, being slidably connected therewith through a pin 35 on the rod 28 movable in an elongated slot 36 in the sleeve 27. Seated on the end of the rod at 37 there is an equalizing spring 38 having its opposite end seated against the block of the pivot 26. Through the timed actuation of the motor 32 the platen is lowered to discharge position and raised to cell closing position to be held against the evaporator under tension of said spring.

At the free end of the platen opposite its pivotal mounting there is provided a reservoir or tank 40 for receiving a supply of liquid to be frozen, such as water, up to a level indicated at 41 under control of a float 42 mounted on a control arm 43 controlling a fluid inlet valve 44 to which a flexible inlet hose 45 is connected, and which hose leads from any suitable source of liquid supply. Secured to the underside of the platen by a bracket 46 there is a pump motor 47 driving a pump within the pump casing as indicated at 48. The pump has its inlet connected to the lower portion of the tank 40 through a liquid intake connecting coupling 49. Said pump discharges through a passage 50 connected with its discharge outlet through a coupling 51. The passage 50 enters a chamber 52 extending throughout the area of the platen and contained therein immediately below the head 21. Communicating with the chamber 52 there is a series of discharge spray nozzles 53, each spray nozzle being located in the head 21 centrally of one of the cells 12. Said nozzles under the pressure of the pump 48 forces the liquid from the chamber 52 in an upwardly and centrally directed spray toward the top of each cell, as indicated by the arrows in Fig. 2.

During the freezing cycle, as the liquid spray strikes the top of the cells and is diverted to the side walls to flow downwardly thereon, an ice film will be built up. However, the waste liquid which has not become frozen passes downwardly from each of said cells through a drainage passage 55 into a series of transverse discharge conduits 56 formed in the head 21. Said discharge conduits lead to the free end of the platen and tank 40, discharging the waste liquid into said tank through the discharge end of said passages indicated at 57, as shown by the arrow. Thus, any liquid that does not become frozen as it is sprayed upwardly into the cells will be returned to the tank 40 and again pumped or circulated back to the chamber 52. Accordingly the liquid will be circulated through the several cells for building up ice cubes therein from the refrigerated walls inwardly until all the space within the cells becomes filled with solid ice. By reason of such circulation any impurities in the liquid will be washed away and back in the tank to accumulate in the bottom thereof so that clear unclouded ice will be formed in the cells.

Communicating with the tank at 58 there is provided a syphon 59 so formed and positioned that upon the liquid in the tank 40 rising to a predetermined level, at the end of the freezing cycle due to surplus water received in the tank from the water channels, the syphon will be caused to function to syphon off the sediment containing liquid accumulated at the bottom of the tank, said sediment being flushed back into the tank from the cells as the ice film is built up therein.

Means is provided for effecting the release of the platen from the frozen ice cubes just prior to it being lowered. For this purpose there is provided a platen release motor 60 driving a worm 61 meshing with a worm gear 68 keyed to a cam shaft 63. Said cam shaft extends across the forward end of the platen 20 having a bearing at the opposite end in the frame 10. Mounted at spaced intervals along the cam shaft 63 there is a series of platen release cams 64 having contact with the upper forward end of the platen. Upon one revolution of the cam shaft, which occurs in timed relation with the defrosting cycle, the cams 64 exert a depressing action on the platen tending to break it away from the frozen ice cubes.

Figure 3:
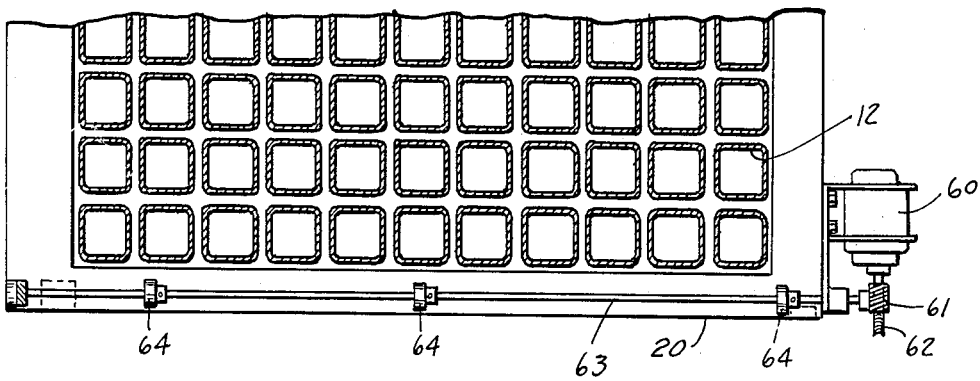
Fig. 3 is a section taken on the line 3—3 of Fig. 1.

The refrigeration system and control therefor are of the character described in the above-mentioned Letters Patent, and include a circuit as shown in Fig. 4. Carried by the frame there is provided the usual thermostatic control switch generally indicated at 65, connected with the heat sensitive bulb 65a through the tube 65b. Said control switch is connected in series with one side of the supply line and including a contact 66 connected to hot valve solenoid 67 and the other side of the supply line. Contact 66 is also connected in series across the supply line with the platen release motor 60 and a microswitch 68 mounted in the way of the platen (Fig. 3) to be closed by the platen after a defrosting cycle, and to be opened by the platen when it reaches its released position after one revolution of motor 60.

Contact 66 is also connected in series with single pole microswitch 69, the primary of transformer 70 and contact 34a of double pole microswitch 34. Switch 69 is mounted in the way of the platen (Fig. 3) to be opened as the platen moves away from its open position and to be closed as the platen reaches its open position.

The second contact 72 of switch 65 is connected in series with the blade 34b of switch 34. This switch includes contact 34c connected in series with the solenoid 73 of the water valve and the pump motor 47. Platen actuating motor 32 is connected across the secondary winding of the transformer 70.

In operation it may be assumed that the evaporator has reached a maximum low temperature after a freezing cycle. At this time switch 65 responds to close contact 66. This completes a circuit through the hot valve solenoid 67 which permits the hot gases to pass into the evaporator, the hot valve having been closed during the freezing cycle. The microswitch 68 will have been closed when platen 20 is closed after a defrosting cycle. Therefore, closure of contact 66 also energizes the platen release motor 60 which operates the driven cams 64 through only one revolution of the cam shaft 63, after which platen 20, in its released position, operates microswitch 68 to break the energizing circuit of motor 60. The microswitch is reset to a closed position when the platen returns to the up position.

Microswitch 69 will have been opened by platen 20 as it approached its open position, and will be closed by the platen 20 when it leaves its open position. Therefore, when switch 69 is closed, contact 66 also closes a parallel circuit through microswitch 69 to energize transformer 70 for driving the platen actuating motor 32, and moving the platen to an ice discharging position. As the platen motor 32 completes its cycle of lowering the platen for discharge of the ice cubes, microswitch 69 is opened to stop motor 32 and arrest the platen. Also, switch 34 is actuated to close contact 34a. The hot gases admitted to the evaporator by the hot valve will release the ice cubes and actuate thermostatic switch 65 to open contact 66 and close contact 72, whereby a circuit is closed through contact 34a and the motor 32. When platen motor 32 has completed its cycle and has again actuated microswitch 34, contact 34a will have been opened and contact 34c closed, stopping the motor 32 and energizing pump motor 47 and water valve solenoid 73 to open the liquid supply valve connected with the flexible hose 45, as indicated at 74, for introducing liquid from the source to the liquid tank.

The sequence of operations are as follows: Liquid is pumped from the tank 40 to the platen chamber 52 and sprayed upwardly into the cells through the spray nozzles 53 by the pump 48, the platen being in its closed position. Refrigerant is then circulated through the passages 19 and 16 in the evaporator to freeze the liquid in the cells. Upon the temperature of the frozen ice cubes reaching a predetermined low temperature, the thermostat 65 operates to actuate the control circuit through the following cycle. The flow of refrigerant is reversed by opening the hot valve through the solenoid 67 to permit hot gases to pass into the evaporator and circulate through the passages 19 and 16. Simultaneously therewith the pump 48 is stopped to prevent any further spray of liquid into the cells. Excess liquid, however, continues to drain from the discharge conduits 56 into the tank 40, raising the water level therein above the syphon 59 to start the syphoning action for withdrawal of impurities from the bottom of the tank.

Thereupon the platen release motor 60 is energized to drive the release cam 64 for depressing the platen and break it away from the formed ice cubes. The platen motor 32 is then energized to lower the platen from the cells. The ice cubes frozen in the cells will become loosened by the defrosting cycle resulting from the passage of hot gases through the evaporator, causing them to slide downwardly as a unit joined by their bottom fins, onto the head of the platen. This action is facilitated by the inwardly sloping arrangement of the walls 14. At this point the platen will be arrested until the ice cubes are fully released thereon. Continued downward swinging movement of the platen will lower it to discharge the frozen cubes into a suitable bin or container. The evaporator, due to increase of temperature by removal of ice cubes, causes the thermostat 65 to close the circuit to energize the platen motor 32 to close the platen, close the hot valve and energize the pump motor 46. The pump will then cause liquid to be sprayed into the cells for freezing and the beginning of a new cycle of operation.

The invention claimed is:

1. In a machine for manufacturing ice, an evaporator unit including a plurality of open bottom ice forming cells, means for introducing a liquid to be frozen into said cells to be subjected to alternate freezing and defrosting cycles, a platen movable to evaporator closing position during an ice freezing cycle and to an open ice discharge position during a defrosting cycle, wherein ice is formed in said cells and upon said platen during the freezing cycle and freed from said cells during the defrosting cycle, a cam shaft mounted on said machine above said platen, a cam on said shaft engageable with said platen, and power means operable following the said freezing cycle to actuate said cam shaft and cam to depress said platen for forced separation from said evaporator and ice upon said cam being rotated to one position and permit said platen to close said evaporator when said cam is moved to another position.

2. In a machine for manufacturing ice, an evaporator unit including a plurality of open bottom ice forming cells, means for introducing a liquid to be frozen into said cells adapted to be subjected to alternate freezing and defrosting cycles, a platen having one end pivotally mounted adjacent said evaporator unit and the other end free to swing to evaporator closing position during an ice freezing cycle and to an open ice discharging position during a defrosting cycle, wherein ice is formed in said cells and upon said platen during said freezing cycle and freed from said cells during said defrosting cycle, a cam shaft mounted on said machine extending over said platen adjacent the free end thereof, a cam on said shaft engageable with the free end of said platen, and power means operable to rotate said shaft and cam one revolution following the said freezing cycle for moving said cam from a position to permit said platen to close said evaporator to a position to break it away from the ice formed therein and permit free swinging thereof to its open ice discharging position.

3. In a machine for manufacturing ice, an evaporator unit including a plurality of open bottom ice forming cells, a platen movable into and away from sealing engagement with said evaporator, a liquid supply tank carried by said platen, a liquid supply head in said platen having a spray nozzle directed upwardly and centrally of each cell and a waste drainage port leading therefrom to said supply tank, and a pump carried by said platen adjacent said tank having its inlet connected with said tank and its discharge connected with said spray nozzles for circulating the liquid to be frozen through said cells and tank, the platen, supply tank, pump and liquid passage therebetween being a rigid unitary structure and hinged at one edge of the platen to permit said structure to swing downwardly and away from the under side of said evaporator, and power means operable between another edge of the platen and evaporator for forcibly breaking the ice seal.

4. In a machine for manufacturing ice, an evaporator unit including a plurality of open bottom ice forming cells, a platen movable into and away from sealing engagement with said evaporator, a liquid supply head in said platen having a spray nozzle directed upwardly into each cell and a waste drainage port leading therefrom, a liquid supply tank secured to and carried by said platen, a pump mounted on said platen having its inlet connected with said tank and its discharge connected with said spray nozzles for circulating the liquid to be frozen through said cells and tank, a source of liquid connected with said tank having a control valve, and a float in said tank operably connected with said valve for limiting the liquid level therein, said platen, liquid supply head, supply tank, pump and interconnecting passages being assembled as a rigid unitary structure and relatively movable as a unit with respect to said evaporator.

5. In a machine for manufacturing ice, an evaporator unit including a plurality of open bottom ice forming cells, a platen movable into and away from sealing engagement with said evaporator, a liquid supply head in said platen having a spray nozzle directed upwardly into each cell and a waste drainage port leading therefrom, a liquid supply tank on said platen movable therewith, a pump having its inlet connected with said tank and its discharge connected with said spray nozzles for circulating the liquid to be frozen through said cells and tank, and a syphon connected at its intake with the lower portion of said tank for syphoning off sediment deposited therein, the bend in said syphon being above the liquid level in the tank during the circulation of the liquid through said cells and tank, and the bend in the syphon being below the liquid level during defrosting and when liquid in the circulating passages drain to said tank.

6. In a machine for manufacturing ice, an evaporator unit including a plurality of open bottom ice forming cells, a platen, said platen being hinged at one side to swing into and away from sealing engagement with the underside of said evaporator, a liquid supply head in said platen having a spray nozzle directed upwardly into each cell and a waste drainage port leading therefrom, a liquid supply tank on said platen movable therewith, a pump having its inlet connected with said tank and its discharge connected with said spray nozzles for circulating the liquid to be frozen through said cells and tank, a source of liquid connected with said tank having a control valve, a float in said tank operably connected with said valve for limiting the liquid level therein, and a syphon carried on the swinging platen and tank and having its intake end connected with said tank operable upon the liquid therein reaching a predetermined level to syphon off the sediment deposited therein.

7. In a machine for manufacturing ice, an evaporator unit including a plurality of open bottom ice forming cells, a platen, said platen being hinged at one side to swing into and away from sealing engagement with said evaporator, a liquid supply head in said platen having a spray nozzle directed upwardly into each cell and a waste drainage port leading therefrom, a liquid supply tank carried by the other side of said platen movable therewith, a pump carried by said platen having its inlet connected with said tank and its discharge connected with said spray nozzles for circulating the liquid through said cells and tank during an ice forming freezing cycle, wherein ice is formed within said cells and upon said platen head during the freezing cycle and freed therefrom during a defrosting cycle, a pressure exerting member mounted on said machine engageable with said platen in a direction to depress it for forced separation from said evaporator and ice, and power means operable to actuate said member following the said freezing cycle.

8. In a machine for manufacturing ice, an evaporator unit including a plurality of open bottom ice forming cells adapted to be subjected to alternate freezing and defrosting cycles, a platen pivotally mounted at one end thereof for swinging into and away from sealing engagement with said evaporator, means for swinging said platen into sealing engagement during a freezing cycle and away from sealing engagement during a defrosting cycle, a liquid supply head in said platen having a spray nozzle directed upwardly into each cell and a waste drainage port leading therefrom, a liquid supply tank carried by said platen into which said waste drainage ports discharge, a pump carried by said platen having its inlet connected with said tank and its discharge connected with said spray nozzles for circulating the liquid to be frozen through said cells and tank, a syphon mounted in said tank having its inner end connected with the lower portion thereof for syphoning off impurities deposited therein from said waste drainage ports upon the liquid in said tank reaching a predetermined level, a cam shaft extending over the upper free end of said platen, a cam on said cam shaft engageable therewith, and power means operable to rotate said cam shaft one revolution to cam said platen from said evaporator and ice formed therein following said freezing cycle.

References Cited in the file of this patent

UNITED STATES PATENTS

| | | |
|---|---|---|
| 1,757,033 | Wolcott | May 6, 1930 |
| 2,542,892 | Bayston | Feb. 20, 1951 |
| 2,575,509 | Bayston | Nov. 20, 1951 |
| 2,633,004 | Leeson | Mar. 31, 1953 |
| 2,657,547 | Heuser | Nov. 3, 1953 |
| 2,717,495 | Andersson | Sept. 13, 1955 |